United States Patent [19]

Milchberg et al.

[11] Patent Number: 5,394,411
[45] Date of Patent: Feb. 28, 1995

[54] METHOD FOR PRODUCING HIGH INTENSITY OPTICAL THROUGH X-RAY WAVEGUIDE AND APPLICATIONS

[75] Inventors: Howard Milchberg, Bethesda, Md.; Charles Durfee, III, Arlington, Va.

[73] Assignee: University of Maryland, College Park, College Park, Md.

[21] Appl. No.: 197,786

[22] Filed: Feb. 16, 1994

[51] Int. Cl.⁶ .............................................. H01S 3/30
[52] U.S. Cl. ...................................... 372/5; 372/76; 372/25; 372/64; 372/22; 372/68; 372/103; 372/98
[58] Field of Search .................. 372/5, 76, 92, 25, 64, 372/22, 68, 98, 103, 9

[56] References Cited

U.S. PATENT DOCUMENTS

| | | | |
|---|---|---|---|
| 4,336,506 | 6/1982 | Silfvast et al. | 372/76 |
| 4,360,514 | 1/1983 | Silfvast et al. | 372/76 |
| 4,498,182 | 2/1985 | Macklin et al. | 372/76 |
| 4,630,274 | 12/1986 | Shafer | 372/9 |
| 4,704,718 | 11/1987 | Suckewer | 372/76 |
| 4,771,430 | 9/1988 | Suckewer et al. | |
| 5,016,250 | 5/1991 | Rosen et al. | 372/5 |

Primary Examiner—Leon Scott, Jr.
Attorney, Agent, or Firm—Christopher N. Sears

[57] ABSTRACT

Optical guiding of intense laser pulses over a distance of more than one Rayleigh length in a plasma is discussed herein using a multi-pulse technique. The first pulse or pulse sequence prepares a shock-driven, axially-extended radial electron density profile which guides a second pulse or sequence of pulses. The profile is also capable of guiding x-rays. The channel will support mode structure exactly analogous to that of an optical fiber waveguide. The method provides a means for guiding of a high intensity optical laser pulse or x-rays over distances well in excess of a Rayleigh length. The distances over which guiding occurs is limited only by the length of the preformed plasma and absorption and possible backscattering of the guided EM radiation. Applications of the method allow for compact x-ray laser devices and electron particle accelerators.

42 Claims, 9 Drawing Sheets

METHOD FOR PRODUCING HIGH INTENSITY OPTICAL THROUGH X-RAY WAVEGUIDE AND APPLICATIONS

STATEMENT OF GOVERNMENT INTEREST

The invention described herein may be manufactured and used by or for the Government of the United States of America for governmental purposes without the payment of any royalties thereon pursuant to a grant by the National Science Foundation through contract NDSF (ECS-8858062), the Air Force Office of Scientific Research Grant No. AFOSR(F49620-92-J-0059), and SDIO(SDIO-T-IS).

FIELD OF THE INVENTION

This invention comprises a method for guiding intense optical laser pulses or x-rays over a distance of more than one Rayleigh length in a plasma using a prepared plasma waveguide technique, and methods and various apparatus for its applications.

BACKGROUND OF THE INVENTION

An electromagnetic (EM) radiation beam traversing a uniform medium or vacuum tends to spatially spread which steadily weakens the beam as it progresses through the medium. Means to confine the beam over great distances include an optical fiber made of glass. However, when the power levels of the EM radiation are sufficiently large, the fiber is destroyed. Moreover, glass fibers cannot transmit x-rays effectively. The present invention provides a new technique and applications for high intensity optical and short wavelength EM transmissions through a gaseous medium without EM beam spatial spreading, and in particular, creating a gaseous optical guiding technique over distances well in excess of a Rayleigh length, which is defined as a characteristic distance that a focused light beam of a certain diameter and wavelength can travel before transverse spreading occurs, by using a prepared plasma refractive index channel.

There is a strong interest in channeling high-intensity laser pulses through plasmas over distances exceeding a Rayleigh length. An early proposed application for channeling was nuclear fusion using long pulse or CW lasers. Recent suggested applications, using intense short pulses, include pumping of x-ray lasers and laser-plasma based particle accelerators. Experiments involving nonlinear processes, such as high harmonic generation, also benefit from an increased interaction length. The present invention has applications in all these areas as presented below.

One approach to channeling of intense pulses, suggested by recent advances in intense pulse laser technology, relies on self-induced modifications of the plasma refractive index. The on-axis enhancement of refractive index by relativistic electron dynamics or by ponderomotive force-driven charge displacement requires extremely high intensities (above $10^{19}$ W/cm$^2$). Although this approach has not been demonstrated, recent calculations show that such an intense short pulse is subject to erosion: the leading edge diffracts due to a balance between forward charge displacement and relativistic electron response and the trailing edge is scattered by Raman instabilities. Even more fundamentally, it is not clear that such focused intensities can even be achieved in a medium: beams approaching the focus can refract due to plasma formation or undergo filamentation, at much lower thresholds than the onset of charge displacement or relativistic effects. The use of prepared index structures however, as outlined in the present invention, provides a means of stable channeling.

The present invention provides a method and means for true channeled guiding of intense optical pulses over distances in excess of a Rayleigh length. As shown later herein, the means also can provide for channeled propagation of x-rays. Prior art that pertains to two application areas of this invention include x-ray lasers and electron accelerators. The main difference of the present invention with the prior art is that the instant invention employs guiding electromagnetic beams (both optical and x-ray) as its main feature, while waveguiding is not obtained or desired by the prior art. Previous patents include Schafer's U.S. Pat. No. 4,630,274 which gives a method and apparatus for generating a hot plasma which emits EM radiation in a wavelength range below about 100 nm in a predetermined volume, in which the laser pulse is of short duration with sufficient energy and power density focused into the volume containing the target material. However, this patent does not teach or suggest applicants' method of creating a light pipe and its' attendant applications of using high intensity optical and x-ray waveguiding capabilities of long heated plasmas once they expand into neutral or weakly ionized gas. This is the central feature of the instant invention's technique, upon which the applications depend. In addition, Schafer's '274 patent recommends creating the plasma with a sub-picosecond pulse, preferably below 0.2 ps. The instant inventions's waveguide creation requires pulses in excess of 1–10 ps or sequences of shorter pulses with sequence duration in excess of 1–10 ps, but in general, no longer than about 1–10 ns. This provides: (1) an axially uniform breakdown or spark which cannot without difficulty be produced with a 0.2 ps pulse, since axicon surface quality requirements are severe and (2) sufficient heating so that the plasma generates a shock and expands to produce a waveguide. In addition, Schafer's '274 patent recommends use of a short wavelength laser (typically an excimer UV laser) to make the long plasma. The instant invention has no such restriction on the laser wavelength. A wide range of wavelengths is appropriate using the instant invention's technique. Moreover, Schafer's '274 patent refers to traveling wave excitation, but this does not refer to the instant invention's process of guiding waves by the plasma. The traveling wave excitation of Schafer's '274 patent refers to the convergence of the axicon-generated conical wave onto the optical axis, which has no bearing upon a guided beam. The instant invention's use of the term traveling wave excitation refers to the excitation provided by the guided pulse as it propagates in the plasma waveguide.

Another previous patent is the Rosen et al. U.S. Pat. No. 5,016,250 of an x-ray laser device that uses a two pulse laser technique provided by optical laser means of relatively low energy and small physical size. The differences with the instant invention are as follows: The Rosen et al. '250 U.S. patent's first pulse prepares a "narrow and linear plasma of uniform composition" along a flat thin foil, which is then heated by a second pulse which is swept across it at the speed of light by means of diffraction from a diffraction grating. Moreover, the Rosen et al. '250 U.S. patent mentions nothing about optical guiding, which is central to the instant invention. The instant invention's first pulse (or pulse sequence) does not heat a flat foil, but heats a gaseous plasma or solid blade edge unlike in the Rosen et al. '250 U.S. patent. The instant invention's first plasma is radially nonuniform for it to effectively act as a waveguide. In the Rosen et al. '250 U.S. patent, the second pulse is focused by a cylindrical lens, along one side and exterior to the first plasma. The instant invention's second pulse (or pulse sequence) is guided along the first plasma (which is a waveguide) and is internal to it, allowing huge enhancements in heating efficiency and repetition rate (see section C (a)). The Rosen et al. '250 U.S. patent specifies energies of 15 joules and 54 joules respectively in the first and second pulses, while our invention requires only in excess of 10 millijoules in either pulse.

Another previous patent is Suckewer's U.S. Pat. No. 4,704,718, which makes no mention of optical guiding, the crucial feature of the instant invention. In the Suckewer patent, two optical laser pulses are used to make an x-ray laser (first pulse: duration 10–100 ns and 1.5 kJ energy; second pulse: 1–2 ps duration and intensity $10^{15}$ W/cm$^2$). The Suckewer patent recommends focusing both pulses from the side. The plasma is confined by an external magnetic field. The instant invention, however recommends use of a Bessel beam (although other means could be used) to prepare a plasma, and a second pulse to be optically guided by this plasma, where the second pulse is injected along the refractive index channel. No magnetic field is required for the instant invention, and as stated earlier, the channel creation pulse can operate with as little as 10 mJ, and should be shorter than 1–10 ns, as opposed to the 10–100 ns duration of the first pulse of the Suckewer invention.

SUMMARY OF THE INVENTION

Guiding of intense laser pulses over a distance of more than one Rayleigh length in a plasma waveguide is discussed herein using a multi-pulse technique. The first pulse or pulse sequence prepares a shock-driven, axially-extended radial electron density profile (the plasma waveguide) which guides a second pulse or sequence of pulses. The plasma waveguide is also capable of guiding x-rays. The plasma waveguide or channel will support mode structure exactly analogous to that of a glass optical fiber waveguide.

The method provides a means for guiding of a high intensity laser pulse or x-rays over distances well in excess of a Rayleigh length. The distances over which guiding occurs is limited only by the length of the preformed plasma and absorption and possible backscattering of the guided EM radiation. The two demonstrations of the method provided below give examples of the parameters to effectively implement the method. The first is a proof-of-principle demonstration of the channeling effect using two pulses, one following the other with variable delay, focused by the same lens. In that experiment, the plasma channel, with an electron density minimum on axis, is generated by the hydrodynamic evolution of the breakdown spark created by the first pulse.

The channel is slightly longer than a confocal parameter. The second pulse, injected after an appropriate delay, experiences lensing due to this short channel. In the second experiment, the channel is extended to 0.7 cm (24-Rayleigh lengths) by means of an axicon. After an optimum delay, the second pulse is injected into the end of the channel. The beam is observed to be confined over the length of the channel, at peak intensities of up to $10^{14}$ W/cm$^2$ for given conditions. Calculations indicate that the channel can in fact guide pulses in excess of $10^{18}$ W/cm$^2$ and will also guide x-rays. Recent results have shown guiding of intense pulses over 70 Rayleigh lengths can be achieved.

An article entitled "Plasma guides high-energy pulses" has appeared in Laser Focus World, January 1994 pp. 33–36. This article reports that this technique will be useful in applications that include pumping of short-wavelength lasers and laser based particle accelerators.

OBJECTS OF THE INVENTION

Accordingly, several objects and advantages of the present invention are:

(a) To provide a method for guiding of EM radiation of high intensity and/or short wavelength through a gaseous plasma medium over distances greater than a Rayleigh length without transverse spreading.

(b) To provide a compact means for soft x-ray lasers, with transverse coherence of the x-ray beam.

(c) To provide a compact means for electron particle accelerators.

(d) To provide a source for transversely coherent x-rays.

(e) To provide a source for longitudinally and transversely coherent x-rays via high order non-linear processes.

Still further advantages will become apparent from a consideration of the ensuing detailed description and drawings.

BRIEF DESCRIPTION OF THE DRAWINGS

FIG. 8b shows the average ionization state $<Z>$ as a function of radius for the same times as in FIG. 8a.

DETAILED DESCRIPTION

Figure 2A:
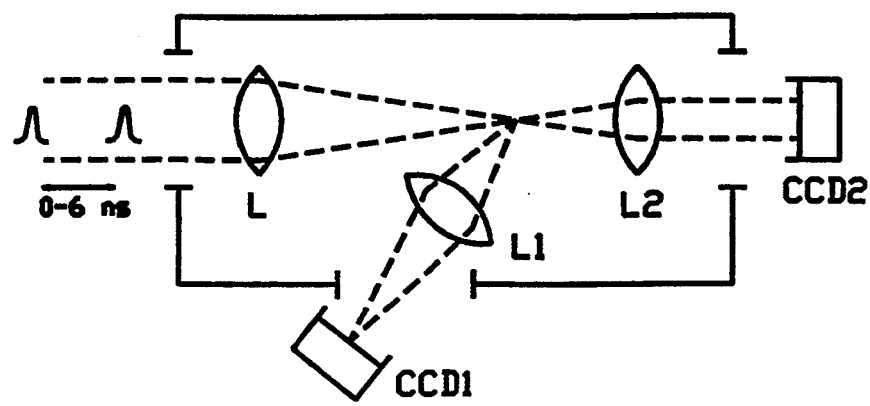
FIG. 2a shows the a first experimental optical arrangement using the method, (demonstration of the principle).
Figure 3A:
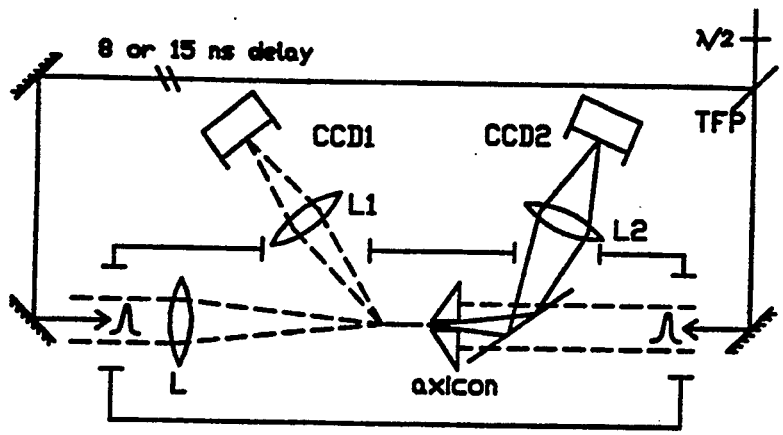
FIG. 3a shows a second preferred experimental optical arrangement using the method.

As schematically shown in FIG. 2a and FIG. 3a, the basic requirements for using the methodology of the invention requires a chamber means for maintaining a proper gas pressure and mix where a long focusing means such as the axicon lens as in FIG. 3a that is shown to focus intense laser pulses into a line focus extending along the lens' axis. The first intense laser pulse from an optical laser source turns the gas in the chamber means into a plasma. For a short time, the plasma channel has a refractive index higher than the surrounding medium, thus acts as a waveguide to a second pulse focused into the plasma, after a delay.

Figure 1:
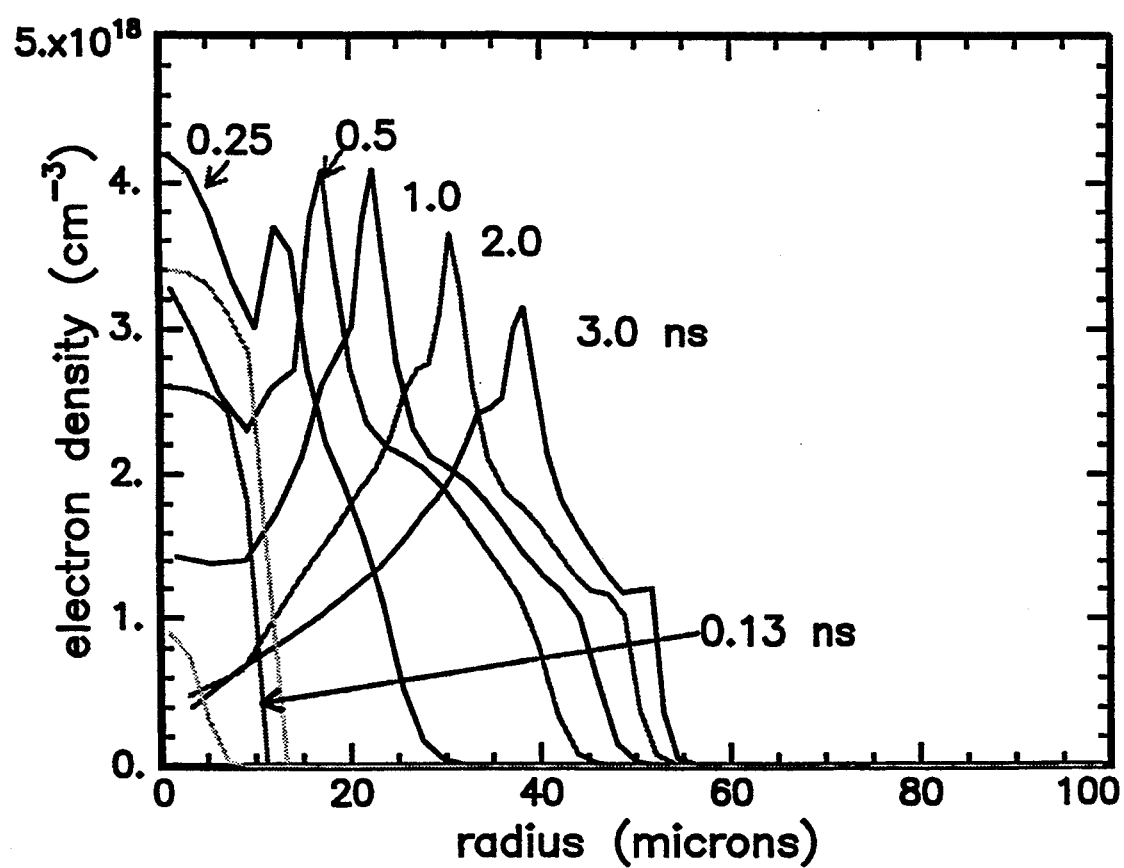
FIG. 1 shows retical calculation of a 30 torr Argon ambient response to a laser pulse of peak intensity of $I = 4 \times 10^{14}$ W/cm$^2$, spot size $w_o = 10$ μm, $\lambda = 1.064$ μm, $\tau_p = 100$ ps. The rapid rise of Ne at early times is due to direct ionization by the laser. The laser pulse, Gaussian in time, peaks at $t = 0.125$ ns and ends at $t = 0.25$ ns.

As a guide for the methods, and to understand in detail how favorable refractive index profiles are generated for the light pipe, calculations of gas response to irradiation by intense pulses are provided. The model includes tunneling ionization in the laser field, laser-plasma heating via inverse bremsstrahlung, thermal conduction, and collision-based ionization and recombination. FIG. 1 shows calculations of radial electron density profiles generated in 30 torr of Ar as a function of time for a 100 ps, $I = 4 \times 10^{14}$ W/cm$^2$ peak intensity pulse, spot size $w_0 = 10$ $\mu$m, $\lambda = 1.064$ $\mu$m, a pulse duration of $\tau p = 100$ ps. A general picture of the plasma dynamics is deduced from these calculations: At lower pressures (<50 torr), ionization during the laser pulse is mostly attributable to direct ionization by the laser field while the electrons are heated by inverse bremsstrahlung (in FIG. 1 to a maximum of ~120 eV). Collisional ionization takes place after the laser pulse, on the time scale of a few nanoseconds, so that the plasma is strongly out of equilibrium. Above approximately 50 torr depending on the gas, avalanche ionization contributes more significantly to the breakdown. The ion temperature remains small over many nanoseconds due to weak electron-ion coupling. Since the tunneling rates increase strongly with laser field strength and space charge keeps the plasma electrically neutral, there is a well-defined boundary, with a precursor controlled by thermal conduction, between the heated plasma and the neutral/weakly ionized gas on the periphery. This results in a large pressure gradient which drives a shock wave in the ion density as the heated electrons move outward, pulling the relatively cold ions along at the local ion sound speed $c_s = (ZkT_e/m_i)^{\frac{1}{2}}$ where $T_e$ is plasma temperature and $m_i$ is ion mass. A depression in the plasma density develops on axis behind the shock, yielding a refractive index profile which can focus a beam. Two timescales $\tau$ can be deduced from this plot: for shock evolution $\tau = $ (shock thickness (i.e. ion-ion mean free path)/sound speed) $\approx 100$ ps, and for overall plasma evolution $\tau = $ (spot size/sound speed) $\approx 1$ ns. Note that the pulse duration ($\tau p = 100$ ps) and the two-pulse delays (0-15 ns) used in the demonstration of the method are well suited to the plasma dynamics. Longer laser pulses would continue to heat the plasma during the shock expansion phase, resulting in a much broader pressure profile and a very wide channel which would be less useful as an optical guide; much shorter pulses of equal energy would not heat the electrons sufficiently to drive the expansion in the presence of conduction losses, since for short pulses, the plasma temperature increase scales as $\tau_p^{3/2}$. Using ponderomotive force charge displacement to generate the radial electron density variations of FIG. 1 would require intensities of at least $10^{19}$ W/cm$^2$.

In the first of the two experiments, it can be demonstrated that the lensing of a laser pulse in ionized gases can be achieved by using two pulses: the first pulse forms a channel for the second. A mode-locked Nd:YAG laser provides 100 ps, $\lambda = 1.064$ $\mu$m seed pulses for input to a 10 Hz flashlamp-pumped Nd:YAG regenerative amplifier (RGA) system, see Durfee and Milchberg in *Optics Letters* Vol. 17, p. 37 (1992). A beam splitter/delay line is placed at the input to the RGA, resulting in two output pulses of adjustable relative energy and time separation (0-6 ns), and identical direction and spatial mode. The pulses are then doubled by passing them through a power amplifier, with final total pulse energy being $E = E1 + E2$ of up to 250 mJ, and then focused at $f/10$ by a 250 mm focal length aplanatic lens (L) inside a chamber, see FIG. 2(A). Lens L1 images scattered laser light and recombination emission (which is termed "fluorescence") from the focal region plasma to a CCD camera (CCD1). For laser scattering, 3 nm bandpass filter around 1.064 $\mu$m is used, while an infrared blocking filter is used for fluorescence. An aplanatic lens L2, on axis, collected laser light at $f/3$ for camera CCD2. Here, images due to pulse 1 are subtracted from two-pulse images in order to provide a pump-probe record of diffraction and refraction of pulse 2 from the evolving plasma. For all images, the signal-to-noise ratio and resolution are improved by using 100 shot averages.

Figure 2B:
FIG. 2b shows a fluorescence images from CCD1 as shown in FIG. 2a from a axicon in 30 torr Argon with $E1 = 70$ mJ, $E2 = 70$ mJ and $w_o = 10$ μm for various delays in pulse 2. Lens L is to the left.

In FIG. 2b, a sequence of spark fluorescence images (CCD1) is shown for argon at 30 Torr for different delays of pulse 2. Here, $E1 = 70$ mJ and $E2 = 70$ mJ (pulse peak intensity $4 \times 10^{14}$ W/cm$^2$, spot size $w_0 = 10$ $\mu$m). Fluorescence shows similar spatial structure as laser scattering (which is weak at 30 torr), although more diffuse, since unlike the prompt scattering of the laser, recombination emission occurs over tens of nanoseconds. As the delay of the second pulse is increased, the spark is lengthened in the direction away from the focusing lens. The onset of lengthening occurs at approximately 3 ns. For nitrogen and xenon, lengthening starts at about 1.3 ns and 5 ns for these conditions. This is in accord with the calculations, which show that heavier gases take longer to develop channels, due to the decrease in ion sound speed. At even longer delays, a secondary spark becomes more pronounced and separates from the first. This is explained in terms of a simple model for a Gaussian beam focused into a short channel with index profile $n = 1\frac{1}{2}(N_e(r)/N_{cr})$, where $N_{cr}$ is the plasma critical density, and $N_e(r)$ increases quadratically from $r = 0$. If the input beam is collimated at the channel entrance, guiding will occur at constant beam size if the electron density difference between $r = 0$ and $r = w_0$ is $\Delta N_e \approx 1/\pi r_e w_0^2$, set by a balance between positive lensing by the plasma and diffraction over a Rayleigh length, where $r_e$ is the classical electron radius. However, in this configuration the plasma is created by pulse 1 on both sides of the focus, and so pulse 2 is converging when it encounters the entrance to the channel. If the index curvature is large enough that the beam waist can complete more than one full period of oscillation, a second spark will appear beyond the original channel. For a given spot size, the maximum separation between the two spark maxima is a function of the length of the channel. For the measured channel length of 1.2 mm, the observed peak separation corresponds to $\Delta N_e \approx 10^{18}$ cm$^{-3}$, in agreement with the calculations of FIG. 1.

Figure 2C:
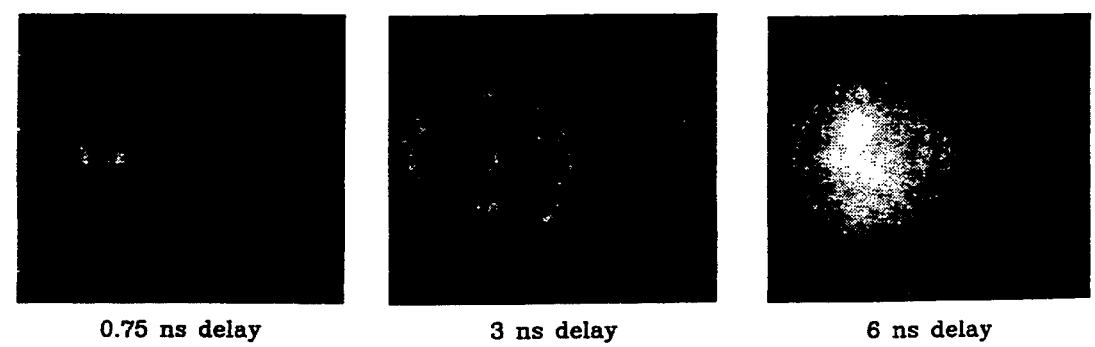
FIG. 2c shows a probe with far-field patterns as seen by CCDs of FIG. 2a for the same delays as in FIG. 2b.

FIG. 2c shows probe (pulse 2) far-field patterns (CCD2), for the same delays as in FIG. 2b. Here, the pulse energies were E1=70 mJ and E2=10 mJ. Increasing E2 to 70 mJ changed the resulting images little. The plasmas are sufficiently long that the patterns result from both diffraction and refraction of the probe pulse. At 0.75 ns, large angle scattering (which overfilled L2) indicates the presence of sharp spatial structure of size $\neq 2$ $\mu$m in the interaction region, consistent with a shock. At 3 ns, this large angle scattering is gone, while there is still modulation close to the beam center. It is at this delay that the probe beam fits inside the shock and lengthening of the spark begins, as seen in FIG. 2b. By 6 ns, the lensing is still sufficient to cause an oscillation, but the beam profile modulation disappears.

The length of the plasma formed by the initial pulse clearly determines the extent to which a second pulse can be guided. In the second demonstration of the method, a long, uniform plasma was produced by means of an axicon, which forms an extended focus along the optical axis. The particular axicon used was a BK-7 glass cone (n=1.51 at 1.06 $\mu$m) with base angle $\alpha=35°$ and an axial hole of diameter $2a=3.2$ mm. The axicon directs rays from a collimated beam at angle $\gamma=25°$ with respect to the optical axis. The axial hole allows passage of an oppositely directed beam. The field dependence near the axis is $|E(r,z)|^2 = |E_0(z)''^2 J_0^2(kr\sin\gamma)$, where $|E_0(z)|^2$ depends on the field distribution of the incident beam and k is the laser wavenumber. For this particular demonstration, the axially extended focus is of length $L = (R-a)(1/\tan\gamma - \tan\alpha) \approx 1$ cm and radius $r_0 = 0.38 \lambda/\sin\gamma = 1$ $\mu$m, where R=0.79 cm is the beam radius at the axicon input. Uniform sparks of length $\approx 1$ cm in both the MPI and avalanche regimes were produced. Axicon-generated sparks have been produced in earlier work with >10 ns laser pulses at or above atmospheric pressure, where breakdown was fully in the avalanche regime.

Figure 3B:
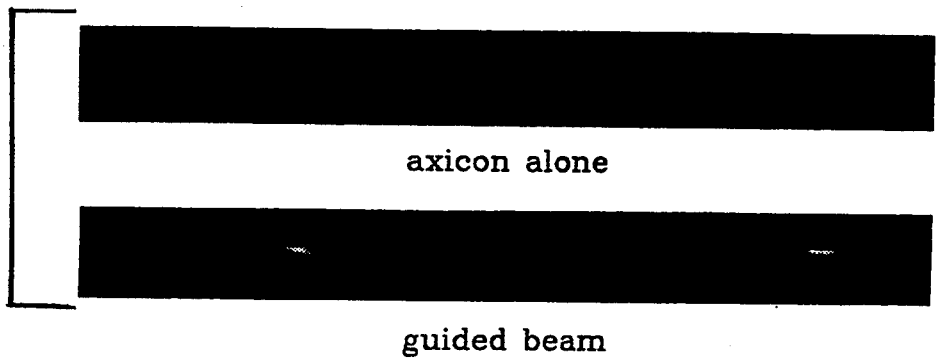
FIG. 3b shows a laser scattering images of CCD1 (for $E1 = 150$ mJ, $E2 = 25$ mj, delay = 15 ns: (i) axicon alone ($\times 5$) and (ii) optimum alignment for guiding of lens beam in channel, showing scattering at channel entrance and exit. Lens L is to the left, and the axicon is to the right.
Figure 3C:
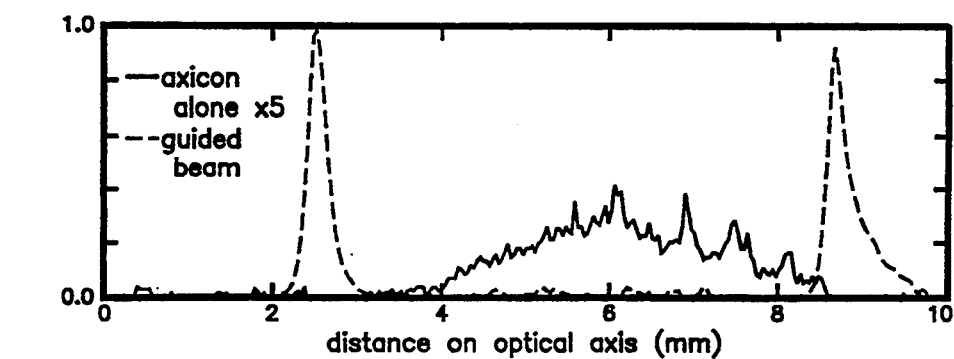
FIG. 3c shows line-outs of images in FIG. 3b.
Figure 3D:
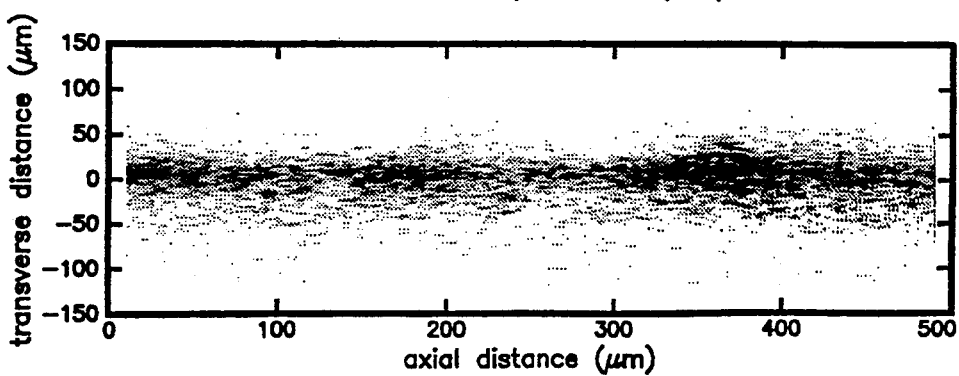
FIG. 3d Thomson scattering image of channel section near center. The scattering image width is 35 μm.
Figure 4:
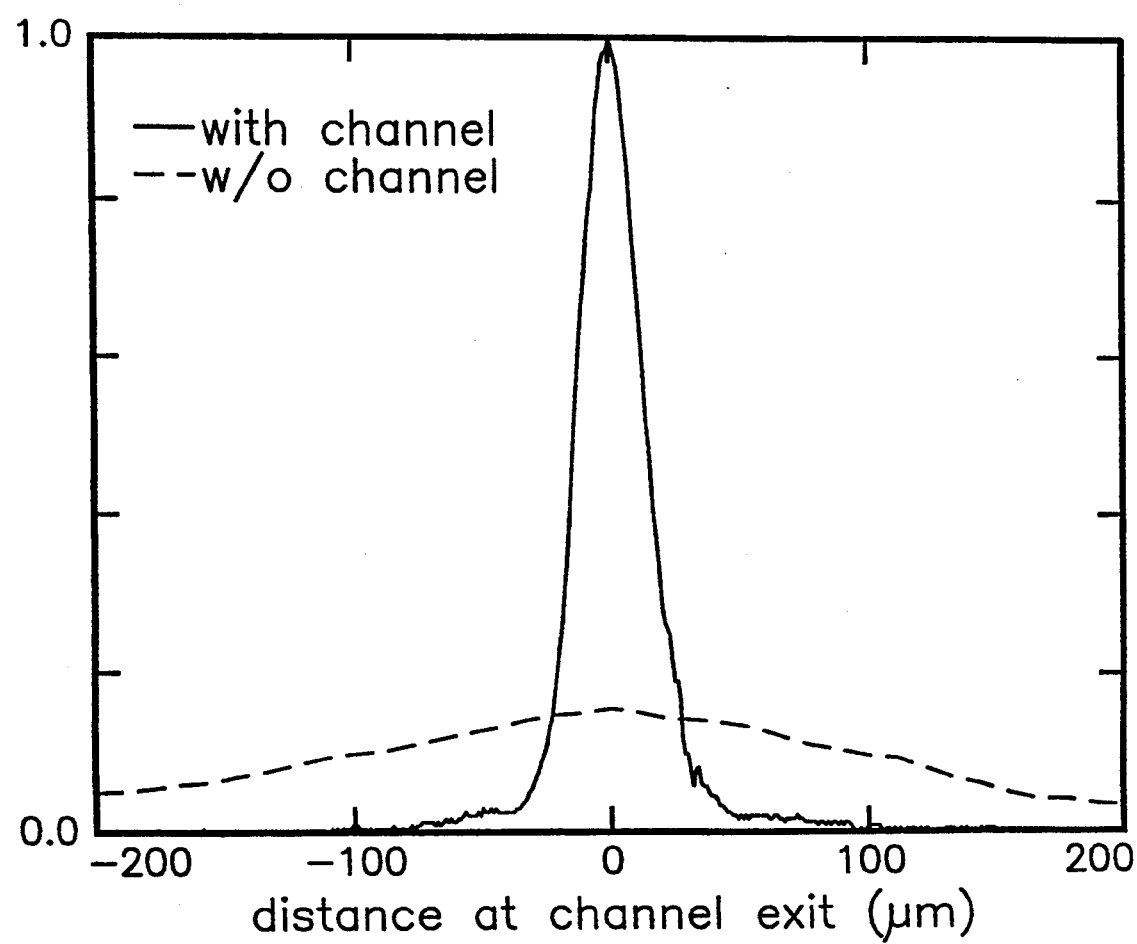
FIG. 4 shows line-outs of images of CCD2 in FIG. 4a from location of channel end with and without channel present; the guided mode is near-Gaussian with FWHM = 25 μm.

The single-pulse output of the laser is split, with one beam (E1) sent to the axicon and the other (E2), with variable delay, directed to a lens L ($f/10$, $w_0=10$ $\mu$m, Rayleigh length$=\pi w_0^2/\lambda=300$ $\mu$m) and focused from the opposite direction onto the end of the axicon spark. A beam splitter behind the axicon and a microscope objective (L2) are used to image the end of the channel onto CCD2 and to measure the coupling efficiency of the lens beam into the channel, see FIG. 3a. Initial alignment is achieved by monitoring (CCD1) fluorescence and laser scattering as the sparks are generated at 10 Hz. For 30 torr of Xe, E1=150 mJ (peak axicon-focused intensity $4 \times 10^{13}$ W/cm$^2$), E2=5-40 mJ, and delay=15 ns, the axicon spark is strongly and uniformly lit up in fluorescence at best transverse alignment of the lens beam. At this density, the axicon spark is produced mainly by MPI. Lateral deviation of the lens beam by 20 $\mu$m in any direction gives rise to enhanced fluorescence only at the leading end, interpreted as interaction with the higher density plasma of the expanding shock. Axial movement of the lens focus too far away from the axicon spark produces an isolated breakdown due to L alone. Movement of the focus too far into the spark produces a local spark superimposed on the axicon's. In order to have sufficient density to observe laser scattering for the same E1 and E2, a mix of 160 torr N$_2$ and 30 torr Xe was used, with Xe promoting avalanche ionization. FIG. 3b shows that at best alignment of the lens beam, scattering of roughly equal amounts appears at the entrance and exit to the axicon spark, with much weaker contribution from the channel; transverse deviations of 20 $\mu$m in any direction produces scattering only at the entrance. Axial movement of L to focus positions away from the entrance produces an isolated spark whose location jitters axially due to seeding of the local avalanche by electrons or ultraviolet emission from the axicon breakdown. Focusing too far into the channel produces scattering at this focus alone. Decreasing the delay to too short a range resulted in strong fluorescence and laser scattering at the leading end only. The much weaker Thomson scattering from the channel interior was imaged by a microscope objective onto a higher sensitivity CCD camera (in place of CCD1). The lens beam is polarized opposite to the axicon beam; its scattering image was filtered with a polarizer. This image, FIG. 3d, shows a section of channel with a scattering region of width 35 $\mu$m. This width extends for the full length of the channel between the end scattering points. At best alignment, with CCD2 a near-Gaussian fundamental mode of FWHM 25 $\mu$m is observed with CCD2 at the channel exit, containing 77% of the energy in the vacuum focal spot of lens L (FIG. 4) for E2=40 mJ. The shape and position of this mode on the detector is independent of the position of lens L (if it is not too close in), except for a decrease in intensity for off-optimum axial position and a much stronger decrease for off-optimum radial position. For longer delays, or closer-in positions of L, there are higher order modes. The image without the channel present is also shown for comparison. This image moves transversely and changes size for radial and axial movements of lens L. In effect, at optimum alignment, optical guiding is observed over the 24 Rayleigh lengths of the axicon channel at intensities up to 10$^{14}$ W/cm$^2$, based on E2, the coupling efficiency, and the guide mode and channel imaging at various delays. In this intensity range, the channel supports mode structure exactly analogous to an optical waveguide. The scattering at the ends (FIG. 3c) increases exponentially with lens beam energy above a detection threshold of 5 mJ, indication of a nonlinear scattering process; below this threshold, guiding is still observed via CCD2. The end scattering is much less pronounced if Ar is used in place of N$_2$.

As another check for guiding, a variable aperture was placed on the axicon; decreasing the aperture diameter reduces the diameter of the beam transmitted by the axicon, resulting in a shorter channel. With the channel length reduced to 4 mm, the mode image of the end of the channel (CCD2) is the same size as in FIG. 4. With the aperture in place, the input beam has a harder edge and the fluorescence gradient at the leading edge of the channel is much sharper, corresponding to a faster axial falloff in electron density. Under these conditions, coupling was reduced compared to the aperture-free case. This suggests tailoring the beam periphery at the axicon input for optimum lens beam coupling to the channel.

A. Basic Properties of the Plasma Waveguide

The high intensity optical through x-ray waveguide is an elongated plasma of at least a few Rayleigh lengths in extent (where the Rayleigh length corresponds to the vacuum focus of the beam injected into the guide) in which the electron density along the optical axis of the beam to be injected is a minimum compared to that at the edge of the guide, the edge being defined as the locus of radial points where the electron density reaches its peak value. The method to reach this situation will be described below. In order to support the propagation of, for example, the lowest order Gaussian mode in a quadratically varying refractive index, the electron density difference between the maximum and minimum values should be at least $\Delta N_e \geq 1/\pi r_o w_0^2$, where $w_o$ is the spot size of the beam to be guided and $r_o = 2.8 \times 10^{-13}$ cm is the classical electron radius. This expression is still reasonably accurate for non-quadratic guides. For guiding a lowest order mode with spot size 10 μm, $\Delta N_e \approx 10^{18}$ cm$^{-3}$ is needed, corresponding to about 30 torr of singly ionized gas. Higher order modes can be guided if $\Delta N_e$ exceeds values determined by the dispersion relation of the particular guide; the dispersion relation can be determined by solving for the guide eigenmodes. For example, for a quadratic guide, the minimum electron density difference required to support a (p,m) mode is approximately $\Delta N_e > (2p+m+1)^2/\pi r_o d^2$, where p=0,1,2, . . . and m=0,1,2, . . . are the radial and azimuthal mode numbers respectively for the resulting Laguerre-Gaussian modes, and d is the radius to the peak electron density.

B. Technique for Producing the Waveguide

The plasma waveguide supports the propagation of pulses that would normally destroy ordinary silica-based optical fibers. The damage threshold of these fibers is typically $10^8$ W/cm$^2$; at high energies, the threshold for damage is even less. The instant invention's waveguide has been shown experimentally to support pulses of intensity exceeding $10^{14}$ W/cm$^2$, and support of pulses in excess of $10^{18}$ W/cm$^2$ is feasible. For these reasons, it is essential that the waveguide be composed of plasma, since intense laser pulses always ionize any neutral material: a plasma is already ionized and can be no further damaged, certainly not in terms of its waveguiding properties. There is the possibility of further ionization of the plasma channel by the intense guided pulse, but this can be shown to be not deleterious to the waveguiding process under a broad range of conditions. The waveguide production and use involves the following components, with their specifications outlined.

(a) Laser Conditions for Waveguide Creation Via Two Types of Breakdown (i) Non-resonant breakdown This laser should typically produce pulses with energy in excess of approximately 10 mJ, with pulse durations in excess of 1-10 ps, but no longer than about 1-10 ns, where 1 ns is a typical hydrodynamic timescale for radial evolution of the heated region. At higher densities of greater than 200 torr, pulses at the short end of these ranges can be used. A sequence of intense pulses (i.e. more than one) could also be used, where the total duration of the sequence should not exceed approximately 10 ns or be shorter than approximately 1 ps. Higher energies can be generally used to make longer plasmas, thus resulting in longer waveguides.

There are two main reasons for these restrictions on the laser pulse: (1) the intensity of laser light focused by the optical element (of section (b) below) should exceed the threshold for multiphoton or tunneling ionization of a component of the gas used (in chamber element of section (c) below). In general, this requires intensities in excess of approx. $10^{13}$ W/cm$^2$; and (2) the laser pulse must induce, via the breakdown process, a strong nonequilibrium situation whereby a radially propagating shock wave is generated at the interface between the hot plasma and the neutral or weakly ionized gas on the plasma periphery. This situation will produce a plasma with an electron density minimum on axis, with an electron density peak at the location of the shock. At a few nanoseconds delay between this plasma producing pulse and the pulse to be injected, the resulting channel is a few laser wavelengths wide and capable of supporting optical modes in the same manner as a conventional optical fiber. Pulses that are longer than approximately 1-10 ns will produce conditions closer to equilibrium, with the shock spatially smeared out and the resulting channel larger. The resulting guide will be analogous to a large core multimode optical fiber with large, complicated mode structures, less useful for the applications to be described. Another problem with pulses longer than approximately 1-10 ns is that they continue to interact linearly and nonlinearly with the expanding plasma produced earlier in their duration. This interaction can result in the production of axially very nonuniform and unpredictable plasmas which is less optimal for making a plasma waveguide. On the other hand, pulses that are shorter than about 1-10 ps will operate in a "short pulse" heating mode where the plasma temperature rise will vary as $\tau^{3/2}$, where $\tau$ is the laser pulsewidth. In general, in this mode, the temperature is not high enough to drive the shock expansion and overcome losses such as thermal conduction. In addition, higher temperature helps to uniformitize the plasma conditions along the channel via transport. Pulses that are also too short will not produce sufficiently axially uniform plasmas, and impose severe quality requirements on the focusing elements (such as axicons-see section (b) below).

(ii) Near-resonant breakdown

The waveguide creation laser can be less intense than specified in (i) if it is tuned to near-resonance of the gas in which the channel is to be created. As an example, sodium vapor can be 2-photon ionized with beams having energy density approximately 1 J/cm$^2$, at λ=0.33 μm, for pulses shorter than about 10-20 ns, i.e. intensities in the range greater than $10^8$ W/cm$^2$. In the case of sodium, the 3s-3p transition will be pumped in near-resonance, followed by ionization from the 3p level. Near resonance instead of exact resonance is chosen so that the beam which creates the extended plasma (for instance, the Bessel beam) isn't excessively absorbed by excitation of the vapor in the region outside and approaching the plasma. The shock wave will still form in this situation, since the energies of the liberated electrons are in the few electron volt range, and the plasma sound speed is thus still well in excess of the sound speed in the surrounding gas. Thus, in this case, the plasma dynamics conditions outlined in section (a) (i) should still obtain.

Alternatively, one could employ low order multiphoton ionization, for example two photon near-resonant ionization. In this case, the rays of the channel creation pulse would not be absorbed as they approach the optical axis, but will only contribute to ionization along the optical axis. In this case, the pulse energy requirements are somewhat higher than those of the excitation followed by ionization scheme.

(b) Optical Element (Single or Compound) Which Directs the Laser of Section (a) Above to a Long Focus A long focal region of high intensity is needed to generate the plasma waveguide. This might be done in a number of ways: focusing of intense lasers by a cylindrical lens or mirror, large Rayleigh length propagation of a high intensity pulse (sufficiently large diameter and short wavelength), or through use of a "Bessel beam".

Figure 5:
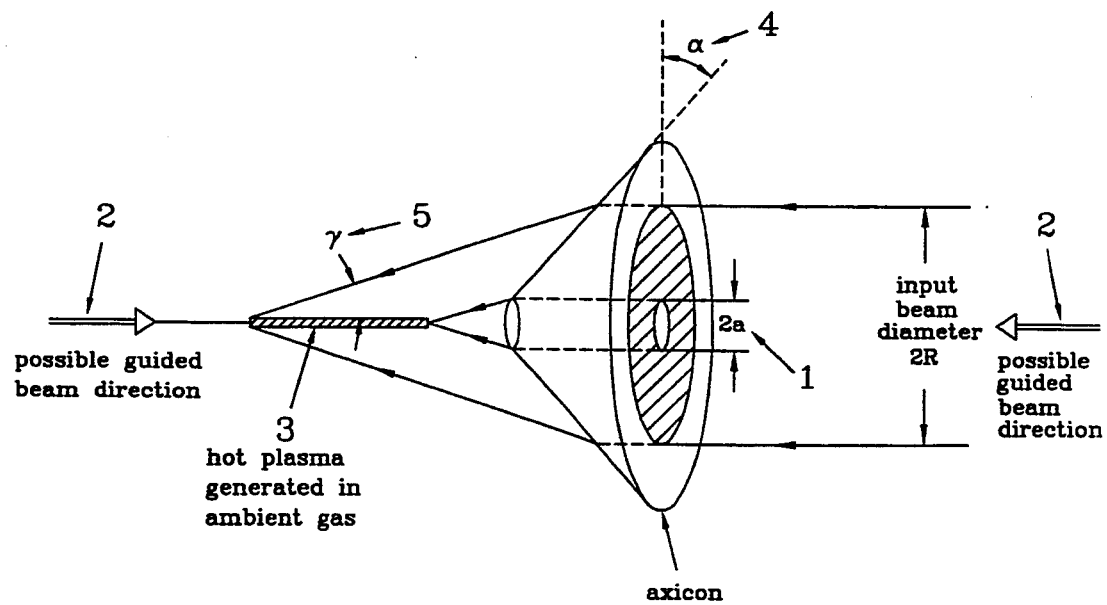
FIG. 5 shows details of the cone axicon, showing relevant angles, dimensions.

The class of optical elements which produces a so-called "Bessel beam" is the most appropriate for waveguide generation purposes, although the method for generation is not restricted to use of a Bessel beam. The reason is that a conical wave is formed which converges on the optical axis, forming an interference pattern with a strong, azimuthally symmetric intensity peak on axis. Unlike the other methods of the previous paragraph, the rays of the conical wave do not have to pass through appreciable plasma created in the earlier phase of the pulse, and heating beam refraction and loss is avoided. In general, the laser electric field varies radially as $J_0(k_\perp(z)r)$ for the full length of the focus along z (the axial coordinate), where $k_\perp(z)$ is the wavenumber perpendicular to the optical axis, and r is the radius from the optical axis. The radius of the high intensity region is $r=2.405/k_\perp(z)$. There are a number of types of element(s) which can produce a Bessel beam. A particular example is the axicon, which is, in the terminology of J. H. Mcleod (J.Opt.Soc.Am. 44, 592 (1954)), an "optical figure of revolution", in which, in the ray optics picture, "a point source on its axis of revolution is imaged to a range of points along its axis". A more complete calculation considering the wave picture produces the radial field dependence quoted above. In the form of axicon which was used in the demonstration of the invention's technique, a BK-7 glass cone, which can be referred to as a "cone axicon", the figure of revolution results from rotation of a straight line about the optical axis. See FIG. 5, an illustration of the cone axicon, with relevant angles and dimensions. The perpendicular wavenumber $k_\perp$ is then independent of z, i.e. $k_\perp(z)$=constant, and the radial width of the high intensity region is constant along the focus as long as the beam input to the axicon is parallel. The invention's preferred axicon has a new modification: an axial hole 1 which allows passage of the possible beam(s) 2 to be guided by the plasma channel 3. The length of the high intensity region along z is given by L=(R-a)(1/(tan γ-tan α)), where R is the input optical beam radius, and a is the axicon hole radius, α is the axicon base angle 4, and γ is the angle of converging rays with respect to the optical axis 5, (see FIG. 5). Axicons with curved surfaces could also be used; they will give rise to a z-dependent high intensity radius. A z-dependent high intensity radius could also be obtained by sending a diverging beam into the cone axicon. It is also noted that the requirement that the pulse duration be in excess of about 1-10 ps relaxes the severe requirement for cone surface quality on the axicon (normally phase errors of no more than a few wavelengths. This is because pulses (or sequences of pulses) longer than about 1-10 ps allow thermal conduction/transport processes to help promote uniformity while the laser is still heating the plasma.

(c) Chamber or Subchamber With Adjustable Pressure Gas Fill, Allowing Possibility of Adjusting Pressure and Gas Type Mix The input laser beam, specified in section (a) above, is brought to a focus in a prepared gas mix in the pressure range of roughly 1–1000 torr. The lower pressure limit ensures that the width of the resulting shock (or the ion-ion mean free path) is smaller than about 10 μm, a typical laser spot size. Then a guide-like structure can develop. A somewhat stronger criterion sets a minimum pressure of about 10–30 torr, corresponding to the need for a minimum $\Delta N_e$ to guide the lowest order mode at a 10 μm spot size as discussed in section A above. Higher pressures will result in guiding of higher order modes, also discussed in section A. The upper pressure range is set by possible refractive defocusing due to ionization as the beam to be guided approaches the entrance to the channel through a region (even if small) of formerly neutral gas. The upper range is somewhat less definite, since it is possible to prepare the channel entrance in the form of a funnel, in order to counteract ionization-based refraction. The channel is produced both by multiphoton ionization, (MPI), and avalanche ionization seeded by MPI. For the laser used in the method demonstration ($\tau$=100 ps, E=5–300 mJ, $w_0$=10 μm, $\lambda$=1.064 μm), MPI dominates below approximately 50 torr, with avalanche ionization dominating above. It is found that the most stable, uniform sparks occur for avalanche ionization. To reduce the laser intensity threshold for saturation of avalanche ionization (and thus to produce longer sparks for a given laser energy), a species such as Xe, which ionizes easily via MPI, is used to "seed" the avalanche of a harder-to-ionize gas (with a higher ionization potential), such as $N_2$. The pressure variation and gas mix capability of the chamber is crucial to the scheme.

Figure 6:
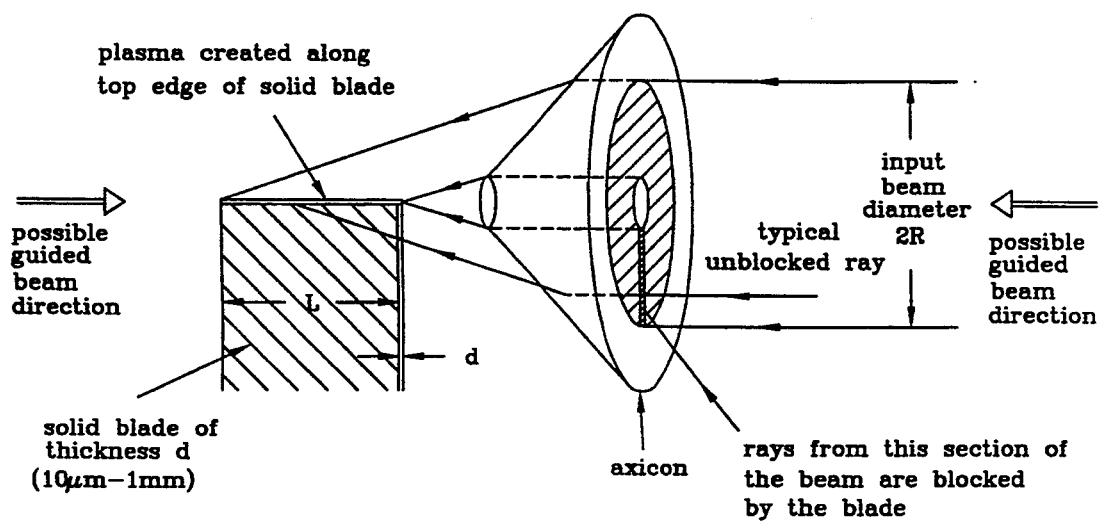
FIG. 6 shows detail of the thin blade or strip lying along axicon focus.

(d) The Long Focus is Produced in the Above Chamber, With Sufficient Laser Intensity to Generate a Breakdown or "Spark" in the Gas or Solid Material Along the Focus The long plasma producing element (for example, the cone axicon) must be placed either fully inside the chamber, in which case the input beam must first pass through a chamber window, or the element may itself form the chamber window. An example of the latter is the subchamber shown in FIG. 7. Alternatively, a thin strip of solid material such as a fiber or edge of a thin blade may be placed along the extended focus, in such a way as not to interfere greatly with the conical wavefront. An example of this is shown in FIG. 6. The channel is created after the plasma created at the surface of the fiber or blade edge expands into a surrounding gas.

(e) Conditions for the Guided Electromagnetic Radiation

The radiation to be guided could be either another laser pulse (without restriction on wavelength), supplied by external means, or radiation (in the optical through soft x-ray range (1–1000 nm)) generated by processes internal to the channel itself, directly or indirectly driven by the guided laser pulse. In the case of guiding of an externally supplied laser pulse, the pulse should, in general, be shorter than about 1–5 ns in order that the guide not evolve too much hydrodynamically while the pulse is propagating through it. The intensity of this pulse is limited only by refractive scattering due to ionization at the channel input. On this basis, guiding of externally supplied intensities as high as $10^{19}$ W/cm$^2$ is possible. The internal processes that give rise to soft x-rays may either be mechanisms for soft x-ray lasers or high harmonic generation (discussed in sect C.(b) and (d) below), or incoherent emission from the guide plasma excited by the guided externally supplied laser pulse.

C. APPLICATIONS OF THE WAVEGUIDE (a) Method for Efficient Pumping of Soft X-ray Lasers The ability to guide an intense pulse over many Rayleigh lengths provides an ideal method for depositing very high powers over long, thin volumes. This allows for the highest intensity power deposition possible for given pulse characteristics. This is exactly the geometry required for pumping prospective soft X-ray lasers. As an example for comparison, the Livermore Nova laser (which occupies a whole building) was used to pump a neon-like Se soft X-ray laser. A standard line focus (with cylindrical optics) of 10 kilojoules of energy produced a spot approximately 100 μm wide and 1 cm long, with peak intensity of $10^{14}$ W/cm$^2$. Nova can fire only a few shots per day. By contrast, the invention herein occupies only part of an optical table, the pulse which is optically guided by the channel has been demonstrated to be at least as intense as $10^{14}$ W/cm$^2$, but the pulse energy is only 40 mJ, and the repetition rate is 10 Hz. The method, again, simply consists of generating a plasma waveguide, as specified above in Section B, and injecting an intense, short pulse into the guide.

(b) General Schemes for Soft X-ray Lasers

The plasma waveguide can result in considerable power deposition by the guided pulse as described in Section C(a) above, thus further ionizing the guide plasma to stages consistent with transitions in the x-ray range. The ionization can be dominated by either the MPI or avalanche process, depending on the guided pulse characteristics and the type and density of the guide plasma. For lower laser powers, avalanche ionization is advantageous since for a given intensity, it will result in more ionization than MPI (since it heats the plasma to higher temperatures), thus accessing shorter wavelength transitions for soft X-ray laser purposes. Both recombination and collisional soft x-ray lasers are possible.

Figure 7:
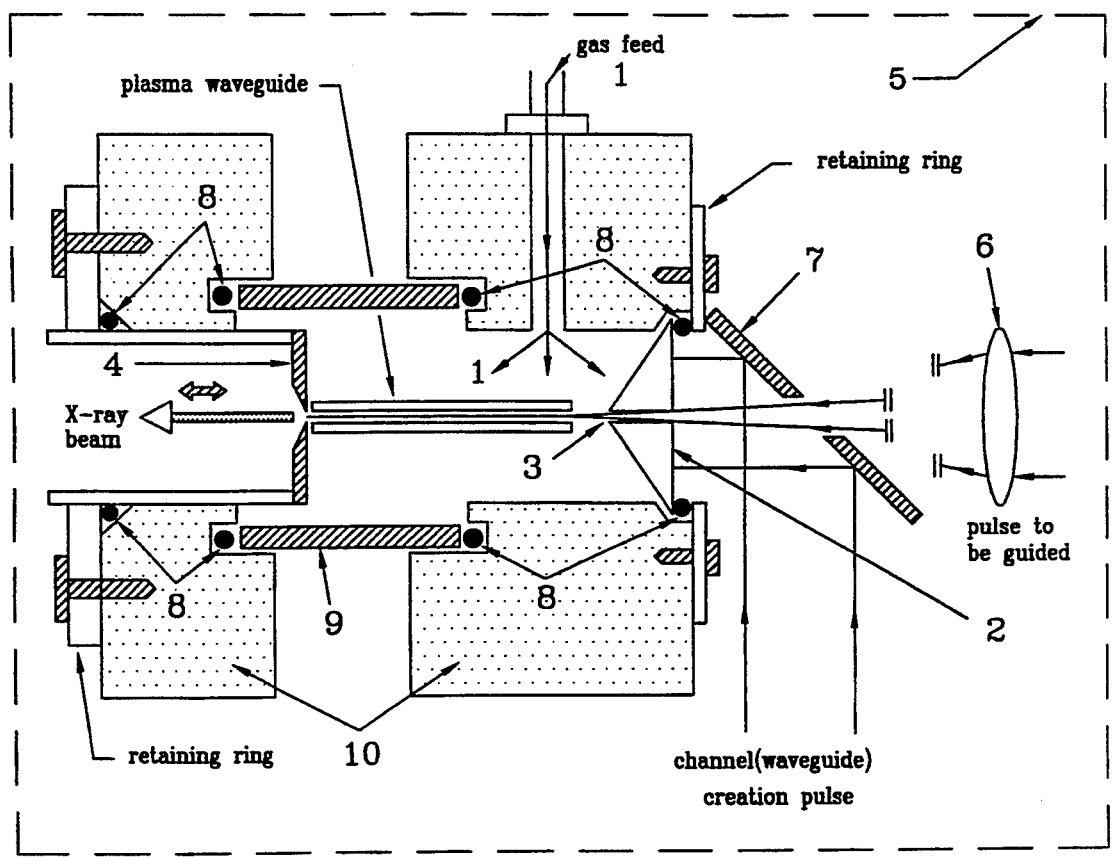
FIG. 7 shows configuration for x-ray laser (applicable to (b)(i) and (b)(ii) below).

The soft x-ray laser schemes outlined in this invention are different than those described in previous patents reviewed in the BACKGROUND section. The main new features that this invention provides are (i) a method for producing a long plasma which can act as an optical guide for EM radiation; (ii) a method for extremely efficient pumping or energizing of the x-ray laser media (outlined in sect. C.(a) above); (iii) a mirrorless method for producing transversely coherent soft x-ray beams (outlined in C.(c) below); and (iv) in the case of recombination schemes, a method for rapid plasma cooling (outlined in sect. C.(b)(i) below). As an example of a possible form for an x-ray laser device, FIG. 7 illustrates an embodiment in which the active gas, chosen to be appropriate to the particular x-ray laser scheme, is pulsed 1 into a subchamber which has an axicon 2 (with a small axial pinhole insert 3) at one end and a retractable pinhole 4 at the other. The axicon pinhole allows the guided beam to enter the plasma waveguide, while the retractable pinhole allows any generated x ray beam to leave the subchamber. In order to prevent photo absorption of the x-rays leaving the subchamber, the subchamber is placed inside a larger vacuum chamber 5 to enable differential pumping to quickly remove gas in the vicinity of the holes. The subchamber's pulsed gas feed 1 (pulsed synchronously with the laser, or with a slow leak) replenishes the gas content of the subchamber and allows it to maintain a reproducible pressure, chosen to be appropriate to the particular x-ray laser scheme. The first laser pulse (or sequence of pulses)(channel creation pulses), conforming to the specifications of Sec. B.(a), is focused by the axicon 2 to form the extended plasma. This pulse may be directed OFF a 45° mirror with a center hole 7. The hole allows passage of the pulse to be guided. After a specified delay, typically 1–20 ns, the second pulse (or sequence of pulses), (pulses to be guided) conforming to the specifications of Sec. B.(e), is focused by the lens 6 into the plasma waveguide that has evolved during the delay. This second pulse (or sequence) acts to further ionize and heat the waveguide plasma, in order to pump the x-ray laser transition of interest. In the the illustration, elements 8,9,10 refer to O-ring seals, a connecting tube, and end fittings respectively.

Figure 8A:
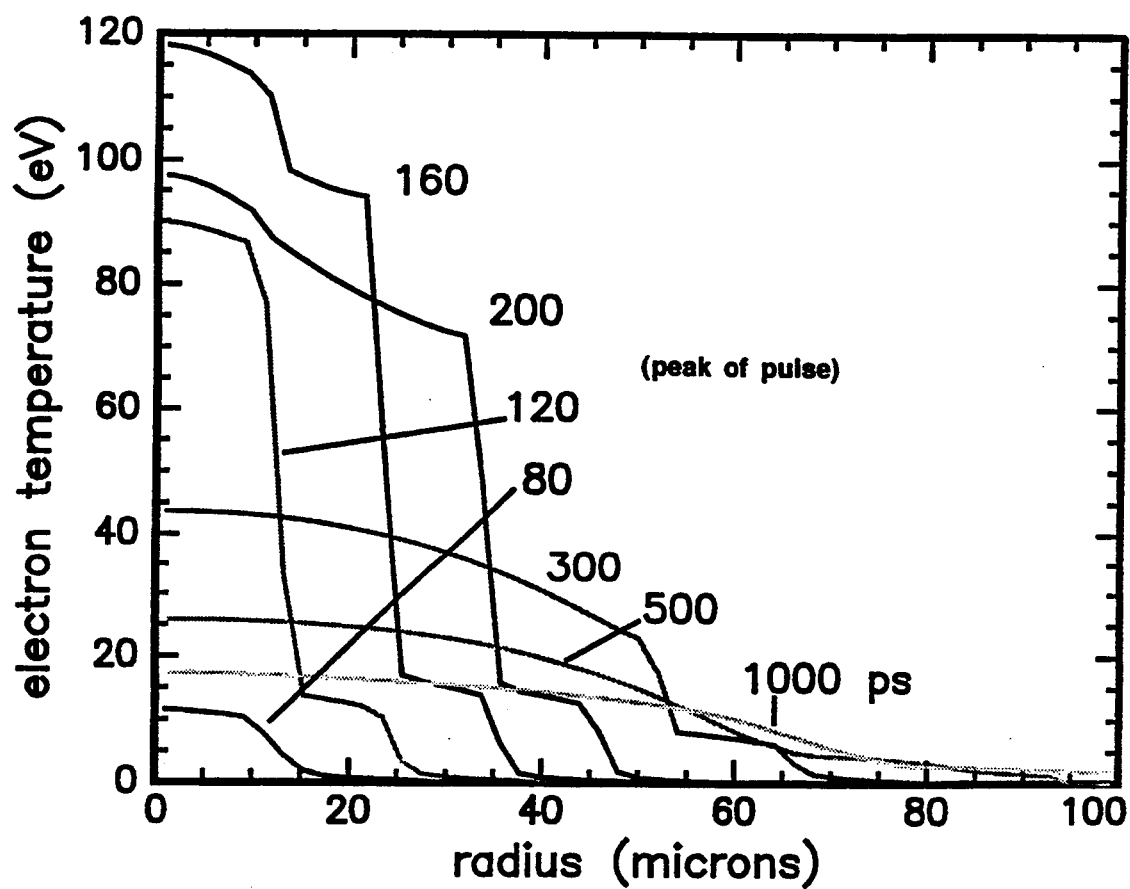
FIG. 8a shows calculations of electron temperature vs. radius for various times after 100 torr of $N_2$ gas has been irradiated by a $2\times 10^{14}$ W/cm$^2$ pulse at $\lambda = 1.064$ $\mu$m.
Figure 8B:
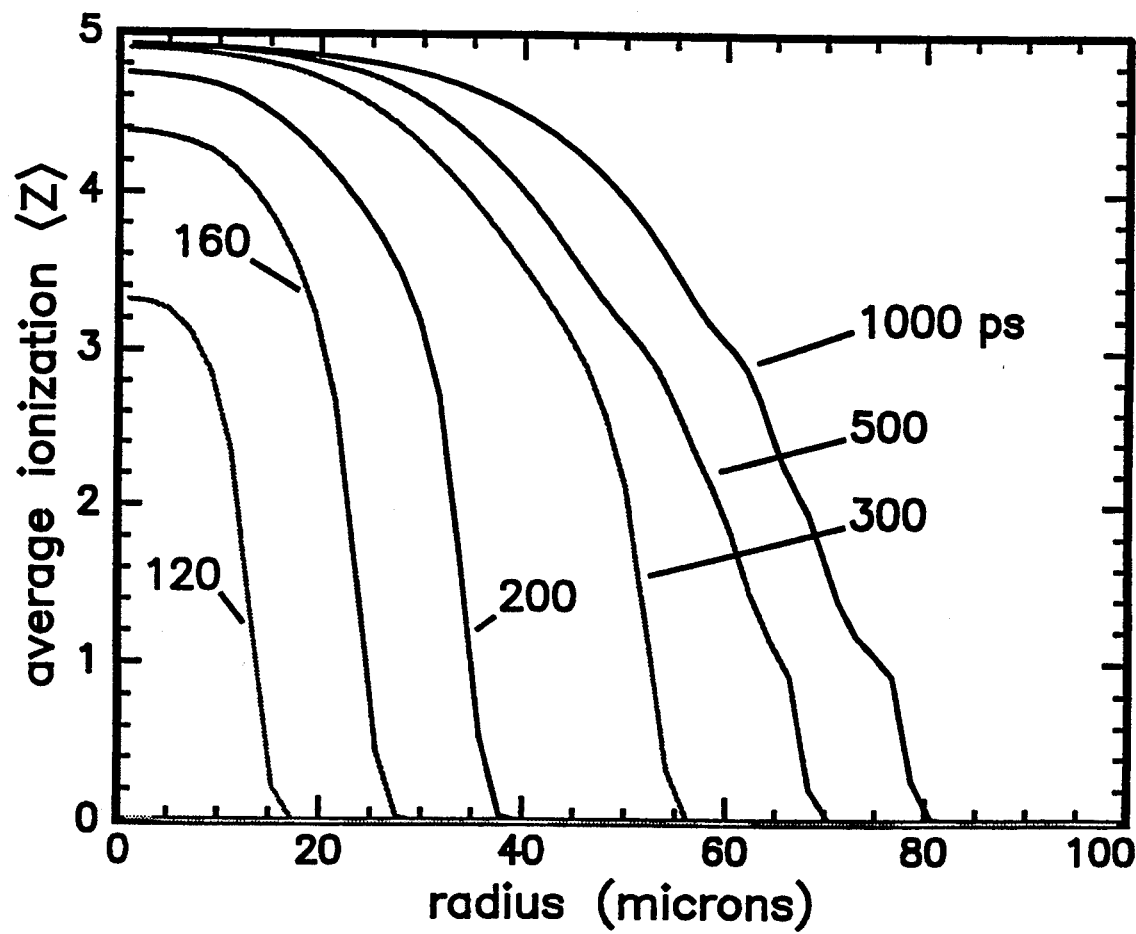

(i) Recombination soft x-ray laser:

To drive recombination lasing, the plasma must cool more rapidly than it recombines- a strongly nonequilibrium situation. If the plasma has been ionized via MPI, it needs to cool less than if it ionized via avalanche. As outlined in Sec. 2 above, the guiding channel is surrounded by neutral and weakly ionized gas on the periphery. This outer region acts as a strong heat sink, and cools the hot channel very rapidly, in fact faster than it can recombine. FIG. 8(a) shows calculations of electron temperature vs. radius for various times after 100 torr of $N_2$ gas has been irradiated by a $2 \times 10^{14}$ W/cm$^2$ pulse at $\lambda = 1.064$ μm, while FIG. 8b shows the average ionization state $<Z>$ as a function of radius for the same times. It is seen the temperature drops extremely rapidly, due to thermal conduction to the surrounding weakly ionized and neutral gas, while the ionization state remains roughly constant which is a clear illustration of the fact that the plasma cools much faster than it can recombine. Thus, if a channel is created in a specifically chosen background gas and further ionized by an intense guided pulse, subsequent cooling due to thermal conduction to the gas on the periphery will result in a population inversion driving recombination and gain in the soft x-ray range.

As an example of a recombination laser, 100 torr of $N_2$ gas could be maintained in the subchamber of FIG. 7 by means of the pulsed gas feed 1. After creation of a 2 cm long plasma waveguide with a laser pulse of energy 100–200 mJ at 1.064 μm, a second pulse with energy 100 mJ is injected after a 5 ns delay, so that an intensity of $5 \times 10^{14}$ W/cm$^2$ propagates down the channel and creates fully stripped nitrogen. This fully stripped nitrogen plasma cools rapidly (FIG. 8a), while the ionization state initially stays roughly constant (FIG. 8b)). During the subsequent recombination process a population inversion can occur between the 3p and 2s levels of hydrogenic nitrogen, with wavelength $\lambda = 134$ Å for the soft x-ray laser line. In place of $N_2$, methane or $CO_2$ could be used under similar conditions as above, in which the ion of interest is hydrogenic carbon, with wavelength $\lambda = 182$ Å for the soft x-ray laser line. Alternatively, the 4f–3d transition in the lithium-like ion of nitrogen or carbon could be used, where the soft x-ray laser wavelengths are 700 Å and 1500 Å respectively. In these cases, the guided pump beam energy requirement is reduced from that specified above.

(ii) Collisional soft x-ray laser:

In the recombination scheme outlined above, pumping is achieved by forcing disequilibrium during the recombination process as illustrated in FIG. 8a and FIG. 8b. By contrast, in the collisional scheme, disequilibrium is forced during the heating and ionization process, whereby the temperature of the heated electrons rises at a rate faster than the plasma excitation or ionization state can match. One method for ensuring higher electron temperatures for a given pulse energy and duration is to use a circularly polarized guided beam.

As a particular example of a collisionally pumped laser, an inert gas such as Ar, already partially ionized by the waveguide creation pulse, could be stripped to its Ne-like state by the guided pulse, either by multiphoton or avalanche breakdown. Greater heating (and therefore disequilibrium) will occur if the guided pulse is circularly polarized. As discussed earlier, the intensity requirement is reduced if avalanche ionization is favored over MPI. For example, to drive a population inversion in the 3s–3p transition in Ne-like Ar requires intensity in excess of $10^{15}$ W/cm$^2$ (higher for MPI and/or linear polarization), which can easily be guided by the plasma waveguide. A possible embodiment of this system is again, FIG. 7, where the type of gas pulsed into the subchamber and the guided laser intensity are chosen to optimize collisional pumping. In the case of a collisionally pumped Ne-like Ar laser, an Ar gas feed 1 would be chosen, along with guided circularly polarized light of intensity in excess of $10^{15}$ W/cm$^2$.

(c) Waveguide for X-rays

The invention herein provides a means to guide radiation independent of wavelength down to the soft x-ray region. As noted above in Sec. A, the approximate density difference required to guide a mode of order (p,m) in a quadratic channel, $\Delta N_e \geq (2p+m+1)^2/\pi d^2 r_0$, is independent of wavelength. This is a special property of a plasma waveguide. Hence, for example, light with wavelength 100 Å can be guided in a fundamental mode of spot size $w_0$ (for $w_0 < d$) as long as $\Delta N_e \geq 1/\pi d^2 r_0$. This guide can also act as a spatial filter for X-rays: any source of x-rays with poor transverse coherence, can have this improved by sufficiently long propagation along the plasma waveguide. An important application of x-ray guiding is in the soft x-ray laser schemes outlined above in (b). First, guiding would confine the propagating x-ray beam to the region where gain is the highest, maximizing efficiency of energy extraction. Second, the guide would enforce transverse spatial coherence of the amplifying x-ray beam, removing the need for x-ray mirrors. No practical scheme to date has proposed using a channel to impose transverse spatial coherence. In fact, of the soft x-ray lasers demonstrated thus far (for example, D. L. Matthews et al., Phys. Rev. Lett. 54, 110 (1985)), only a single pass mirror has been demonstrated (N. M. Ceglio and D. G. Stearns, Opt. Lett. 13, 108 (1988)). The problem with a mirror-based cavity is that the gain is usually short-lived compared to a cavity round trip time, so that at most, only a couple of round trips is possible. An x-ray waveguide, however, essentially performs the mirroring operation as the beam propagates, so that traveling wave pumping by the guided pulse is possible, easily compensating for the short-lived gain. The transverse coherence properties of the plasma waveguide are an indispensable component of the x-ray laser schemes outlined above in (b).

(d) Guided and Phase-Matched Coherent X-rays Produced By High-Harmonic Generation in a Plasma Waveguide Recently, it has been shown that intense laser pulses, when focused into gas jets, can produce very high order harmonics, which can extend into the soft x-ray range (for example, X. F. Li et al., Phys. Rev. A 39, 5751 (1989)). The yield of high harmonics, or the efficiency, has been small, however, mainly due to two reasons: First, the interaction length has been limited to the Rayleigh length of the intense pulse, and second, there is poor phase matching (from focusing geometry and material dispersion) between the generated harmonic and the polarization wave. The present invention's channeling method clearly eliminates the first problem. As for the second limitation, the guide eliminates the focusing geometry phase mismatch. The guide is also capable of supporting many modes, each with a different phase velocity. This will allow phase matching and elimination of the material dispersion problem. Phase matching could also be accomplished by choosing an appropriate gas mix for the plasma channel, and by means of the apparatus shown in FIG. 7 by injecting the appropriate gas mix with pulsed gas feed 1.

(e) Charged Particle Accelerator (i) Application to "Wake-Field" Accelerator:

It has been shown by Tajima and Dawson (Phys. Rev. Lett. 43,267 (1979)) that a strong plasma wave, a "wake-field", induced by an intense laser pulse, could be used to accelerate electrons to high energy, if the electrons are injected into the wave in phase with the group velocity of the laser pulse. Until the present invention, there was no means to keep the laser pulse sufficiently intense (beyond a Rayleigh length) to drive the wake over long distances, and thus accelerate electrons over these long distances. With use of the plasma waveguide, the intense guided beam can generate a strong wake-field for the full length of the guide.

Figure 9:
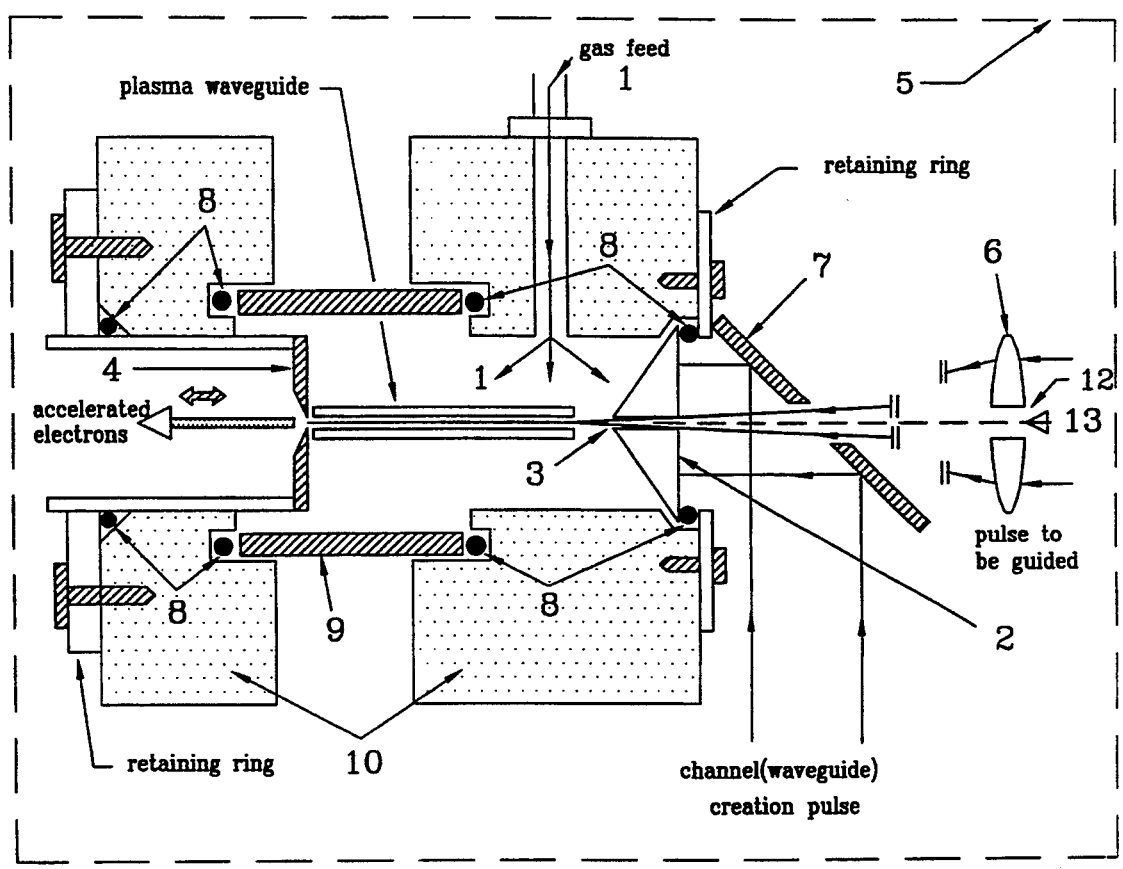
FIG. 9 shows the configuration for an electron accelerator.

Tajima and Dawson point out that the maximum energy an accelerated electron could achieve in such an accelerator is $W_{max} = \lambda_{max} mc^2$, where m is the electron mass, c is the speed of light, and $\lambda_{max} = 2(\omega \omega_p)^2$, where $\omega$ is the laser frequency and $\omega_p$ is the plasma frequency. For a laser of wavelength $\lambda = 1$ $\mu$m, intensity $I = 10^{18}$ W/cm$^2$, and plasma density $N_e = 10^{18}$ cm$^{-3}$, the electron could reach energies of 1 GeV over a distance of 1 cm. The barrier to this goal in the past has been maintaining such a high laser intensity over distances as long as 1 cm. The present invention, as applied to the optical guiding of high intensity laser light up to and in excess of $10^{18}$ w/cm$^2$, provides a means for surmounting this barrier. A possible embodiment of a wake-field plasma accelerator is shown in FIG. 9. This device is similar to that shown in FIG. 7, except that a small hole 12 exists in the guided beam focusing lens 6 to allow passage of an relativistic electron beam produced by a means for this beam 13. The electron beam means should, in general, pulse at the repetition rate of the channel formation and guided pulse sequences. In order to synchronize the arrival of this electron pulsed beam with the wake-field generated by the guided pulse in the plasma waveguide, the electron beam means might contain a laser-induced photocathode (synchronized with the plasma waveguide producing and guided lasers), a device well known and described in the accelerator literature. The accelerated electrons emerge through the retractable pinhole, which has been located to be at the end of the plasma waveguide. As in the x-ray laser case (Sec. C.(b) above) the subchamber of FIG. 9 is placed in a larger vacuum chamber 5 and is differentially pumped, so that subchamber gas in the vicinity of the holes is removed.

(ii) Application to "Beat-Wave" Accelerator:

In the beat-wave accelerator, two moderately intense pulses are combined so that a difference frequency pulse is produced, where the individual pulse frequencies are chosen so that the difference frequency matches the plasma frequency. In this way, a large amplitude plasma wave can be "pumped" by the difference frequency wave. This plasma wave is then used to accelerate electrons. The present invention's channeling method offers a means to propagate the two constituent pulses over long distances. The pulses would both be injected into the plasma waveguide.

Although the description above contains many specificities, these should not be construed as limiting the scope of this invention but as merely providing illustrations of some of the presently preferred embodiments of this invention.

We claim:

1. A method of guiding intense electromagnetic (EM) radiation pulses over a distance of more than one Rayleigh length for a device requiring high intensity laser induced processes in a plasma produced in a first medium surrounded by a second medium in at least a first chamber, the method comprising the steps of:
    supplying at least one first laser pulse to the first medium by a first laser source means whereby the at least one first laser pulse produces a plasma in the first medium generating a pressure gradient between the plasma and the second medium;
    generating a shock wave which in turn induces a refractive index profile channel greater than one Rayleigh length in the plasma; and
    supplying at least a single second EM pulse with an appropriate delay from the at least one first laser pulse by a second EM source means along the axis of the refractive index profile channel of the plasma for transmission through the plasma whereby the channel performs as a plasma EM waveguide.

2. The method of claim 1 wherein the second EM source means is an optical laser source.

3. The method of claim 2 wherein the laser source which is the second EM source means originates from the first laser source means whereby a beam splitter element is used with an optical delay means to delay the second laser pulse.

4. The method of claim 2 wherein the laser source which is the second EM source means is a different laser than the first laser source means.

5. The method of claim 1 wherein the second EM source means is an x-ray source.

6. The method of claim 5 wherein the x-ray source is a source external to the plasma EM waveguide.

7. The method of claim 5 wherein the x-ray source is a source internal to the plasma EM waveguide.

8. The method of claim 1 wherein the at least one first energy pulse is of a duration range greater than about 1-10 picoseconds and less than about 1-10 nanoseconds.

9. The method of claim 8 wherein the at least one first energy pulse is a sequence of intense pulses within the duration range specified.

10. The method of claim 8 wherein the at least one first energy pulse is a single intense pulse within the duration range specified.

11. The method of claim 1 wherein the first laser source means is focused by an optical element means for directing EM radiation to a long focus.

12. The method of claim 11 wherein the optical element means is a cylindrical focusing means.

13. The method of claim 12 wherein the cylindrical focusing means is a lens.

14. The method of claim 12 wherein the cylindrical focusing means is a mirror.

15. The method of claim 11 wherein the optical element means is a Bessel beam producing element.

16. The method of claim 15 wherein the Bessel beam producing element is an axicon.

17. The method of claim 1 wherein the first medium is a gas and the second medium is the same gas.

18. The method of claim 1 wherein the first medium is a solid blade and the second medium is a gas.

19. The method of claim 1 wherein the at least one second EM pulse is of total duration no longer than about 10 ns.

20. The method of claim 1 wherein the device requiring high intensity laser-induced processes is an x-ray laser device.

21. The method of claim 1 wherein the device requiring high intensity laser-induced processes is a generator of high harmonics of the at least one second EM pulse.

22. The method of claim 1 wherein the device requiring high intensity laser-induced processes is a laser-plasma accelerator.

23. The method of claim 22 wherein the laser-plasma accelerator is a wake-field accelerator.

24. The method of claim 22 wherein the laser-plasma accelerator is a beat-wave accelerator.

25. An x-ray laser device which provides x-rays comprising:
    a first laser means for supplying at least one first laser pulse that produces a plasma waveguide;
    a first medium to which the at least one first laser pulse is applied to produce the plasma waveguide;
    a second medium surrounding the first medium;
    a second laser means for supplying at least one second laser pulse to be directed along the axis of the plasma waveguide;
    a means for delaying the at least one second laser pulse with respect to the at least one first laser pulse;
    at least a first chamber means enclosing the first and the second medium;
    access means to the at least first chamber means for the at least one first laser pulse and the at least one second laser pulse;
    a first optical means for producing an extended plasma longer than a Rayleigh length by means of the at least one first laser pulse; and
    a second optical means for directing the at least one second laser pulse from the second laser source along the axis of the plasma waveguide produced by the first optical means,
    whereby the plasma waveguide produced by the first laser means, which optically guides the second laser pulse from the second laser means, will guide and amplify the x-rays resulting from operation of the device.

26. The x-ray laser device in claim 25 wherein the first medium is a gas and the second medium is the same gas.

27. The x-ray laser device in claim 25 wherein the first medium is a solid blade and the second medium is a gas, and an edge of the blade lies along a focus produced by the first optical means.

28. The x-ray laser device in claim 27 wherein within the at least first chamber means, which is the vacuum chamber, the second chamber means contains the solid blade and the gas.

29. The x-ray laser device in claim 28 wherein the at least first chamber means is differentially pumped with respect to the second chamber means, and the second chamber means being supplied by a means for gas feed such that a required pressure exists in the second chamber for production of the plasma waveguide in combination with the plasma produced by the solid blade, whereby a small aperture means allows for both the differential pumping of the at least first chamber means and emergence of x-rays from the plasma waveguide in the second chamber means.

30. The x-ray laser device in claim 25 wherein the first medium is a solid blade and the second medium is a vacuum, and an edge of the blade lies along a focus produced by the first optical means.

31. The x-ray laser device in claim 25 wherein within the at least first chamber means which is a vacuum chamber, there is a second chamber means containing a gas.

32. The x-ray laser device in claim 31 wherein the at least first chamber means is differentially pumped with respect to the second chamber means, and the second chamber means being supplied by a means for gas feed such that a required pressure exists in the second chamber for production of the plasma waveguide, whereby a small aperture means allows for both the differential pumping of the at least first chamber means and emergence of x-rays from the plasma waveguide in the second chamber means.

33. The x-ray laser device in claim 25 wherein the first optical means is a Bessel beam forming means.

34. The X-ray laser-device in claim 33 wherein the first optical means is an axicon with an axial hole along a plasma waveguide axis.

35. A laser-plasma charged particle accelerator, comprising:
a first laser means for supplying at least one first laser pulse to produce a plasma waveguide;
a medium to which the at least one first laser pulse is applied to produce the plasma waveguide;
a second medium surrounding the first medium
a second laser means for supplying at least one second laser pulse to be directed along the axis of the plasma waveguide;
a means for delaying the at least one second laser pulse with respect to the at least one first laser pulse;
at least a first chamber means enclosing the first and second medium;
access means to the chamber for the at least one first laser pulse and the at least one second laser pulse;

a first optical means for producing an extended plasma longer than a Rayleigh length by means of the at least one first laser pulse;
a second optical means for directing the at least one pulse from the second laser source along the axis of the plasma waveguide produced by the first optical means;
a pulsed-means for supplying pulses of high energy charged particles to be directed along the axis of the plasma waveguide; and
a means for synchronizing the pulsed means for high energy charged particles with the at least one pulse from the first laser means.

36. The device of claim 35 wherein the first medium is a gas and the second medium is the same gas.

37. The device of claim 36 wherein within the at least first chamber means which is a vacuum chamber, there is a second chamber means containing the gas.

38. The device of claim 37 wherein the at least first chamber means is differentially pumped with respect to the second chamber means and the second chamber means being supplied by a means for gas feed such that a required pressure exists in the second chamber for production of the plasma waveguide, whereby a small aperture means allows for both the differential pumping of the first chamber means and emergence of accelerated electrons from the plasma waveguide in the second chamber means.

39. The device of claim 35 wherein the at least one second laser pulse provided by the second laser means is a single pulse, and the device is a wake-field accelerator.

40. The device of claim 35 wherein the at least one second laser pulse provided by the second laser means consists of 2 pulses differing in frequency by a plasma frequency of the plasma waveguide, and the device is a beat-wave accelerator.

41. The device of claim 35, wherein the second optical means contains an axial aperture for passage of the pulses of high energy charged particles that are directed along the axis of the plasma waveguide.

42. A high harmonic generator, comprising:
a first laser means for supplying at least one first laser pulse to produce a plasma waveguide which is a first medium that the at least one first laser pulse produces;
a second medium surrounding the first medium;
a second laser means for supplying at least one second laser pulse to be directed along the axis of the plasma waveguide;
a means for delaying the at least one second laser pulse with respect to the at least one first laser pulse;
at least a first chamber means enclosing the first and second medium;
access means to the chamber for the at least one first laser pulse and the at least one second laser pulse;
a first optical means for producing the plasma waveguide longer than a Rayleigh length by focusing the at least one first laser pulse; and
a second optical means for directing the at least one pulse from the second laser means along the axis of the plasma waveguide produced by the first optical means;
whereby a dispersion relation of a guiding structure of the plasma waveguide will allow for phase matching of a high harmonic wave with a nonlinear polarization wave induced in the plasma waveguide by the at least one second laser pulse.

* * * * *